Patented Feb. 20, 1934

1,947,939

UNITED STATES PATENT OFFICE 1,947,939

NEW COPPER OXIDE-AMMONIA CELLULOSE SOLUTIONS

Emil Hubert and Karl Weisbrod, Elberfeld, Germany, assignor to I. G. Farbenindustrie Aktiengesellschaft, Frankfort - on - the - Main, Germany, a corporation of Germany No Drawing. Application October 3, 1928, Serial No. 310,178, and in Germany October 10, 1927

8 Claims. (Cl. 106—40)

The present invention relates to new copper-oxide-ammonia-cellulose solutions and to a process of preparing same.

It is known, that the cellulose in normal copper-oxide-ammonia-cellulose solutions is already partially depolymerized during the solution process. We have found that this depolymerization is due for the most part to the influence of the copper present in the solution, which probably acts in such a manner, as to catalytically promote a depolymerizing oxidation of the cellulose by the air coming in contact with the solution. But it is to be understood that the injurious action of the copper may partly be of another, at present unknown, character. We have further found that the depolymerization of the cellulose can be hindered and that copper-oxide-ammonia-cellulose solutions of especially high quality and viscosity can be obtained by adding to the copper-oxide-ammonia solutions before or during the addition of cellulose, a small amount of a substance capable of eliminating the injurious action of the copper. These substances may be entitled "copper poisons" and are compounds containing the cyanogen group, such as ammonium-, alkali metal-, and other inorganic or organic salts of hydrocyanic acid.

In this manner copper-oxide-ammonia-cellulose solutions are obtainable which show a surprisingly high viscosity compared with the solutions obtainable in the same manner, but without the addition of a copper poison. When treating these solutions according to known methods in order to form artificial silk, films, filaments, etc., these latter also are of especially high quality.

The following example illustrates our invention, without limiting it thereto, the parts being by weight:

Example.—162 parts of wet finely ground cotton are mixed with basic copper sulfate in a quantity corresponding to 90 parts of copper, pressed out and introduced, while stirring, into 1500 parts of an aqueous ammonia solution of 15% strength to which 3 parts of potassium cyanide have been added. The mixture is then further treated according to known methods until the cellulose has dissolved.

The cellulose solution thus obtainable (containing about 8% of cellulose and 8–12% of ammonia) is of very viscous character and in consequence nearly unable to flow, whereas when working in the same manner but without the addition of potassium cyanide a rather easily flowable solution, of about the consistency of syrup is obtained.

In order to more clearly define the effect obtainable acording to our process in terms of the viscosity, the following table may be given:

2 grams of cellulose are dissolved in 98 grams of a copper-oxide-ammonia solution containing 0.9% of copper and 15% of ammonia. The viscosity of this solution may be regarded unity. Then the viscosity of the same solutions but with the addition of for instance:

0.1%=5% calculated on the amount of cellulose of potassium-ferricyanide is 3.1.

0.02%=1% calculated on the amount of cellulose of potassium cyanide is 5.3.

0.1%=5% calculated on the amount of cellulose of potassium cyanide is 8.9.

0.1%=5% calculated on the amount of cellulose of mercuric cyanide is 9.8.

0.1%=5% calculated on the amount of cellulose of potassium ferrocyanide is 10.5.

0.1%=5% calculated on the amount of cellulose of cyanacetamide is 5.4.

We claim:

1. The process which comprises preparing a cellulose solution in aqueous copper-oxide-ammonia in the presence of potassium cyanide in an amount up to 5% calculated on the amount of cellulose used.

2. A composition of matter comprising a solution of cellulose in copper-oxide-ammonia, and potassium cyanide.

3. A composition of matter comprising a solution of cellulose in copper-oxide-ammonia, and potassium ferrocyanide.

4. A composition of matter comprising a solution of cellulose in copper-oxide-ammonia, and potassium ferricyanide.

5. The process which comprises preparing a cellulose solution in aqueous copper-oxide-ammonia in the presence of a cyanide selected from the group consisting of inorganic cyanides soluble in aqueous copper-oxide-ammonia and cyanacetamide.

6. The process which comprises preparing a cellulose solution in aqueous copper-oxide-ammonia in the presence of a cyanide selected from the group consisting of inorganic cyanides soluble in aqueous copper-oxide-ammonia and cyanacet-amide in an amount up to 5% calculated on the amount of cellulose used.

7. The process which comprises preparing a cellulose solution in aqueous copper-oxide-ammonia in the presence of cyanacetamide in an amount up to 5% calculated on the amount of cellulose used.

8. A composition of matter comprising a solution of cellulose in copper-oxide-ammonia and an inorganic cyanide soluble in aqueous copper-oxide-ammonia.

EMIL HUBERT.
KARL WEISBROD.